United States Patent
Hwang et al.

(10) Patent No.: US 10,256,891 B2
(45) Date of Patent: Apr. 9, 2019

(54) MOBILE COMMUNICATION DEVICE AND METHOD FOR SELECTING A BEAM DIRECTION

(71) Applicant: Intel IP Corporation, Santa Clara, CA (US)

(72) Inventors: Yeong-Sun Hwang, Oberhaching (DE); Ziyang Ju, Munich (DE); Holger Neuhaus, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/959,316

(22) Filed: Apr. 23, 2018

(65) Prior Publication Data
US 2018/0331748 A1 Nov. 15, 2018

(30) Foreign Application Priority Data

May 12, 2017 (DE) .......................... 10 2017 110 348

(51) Int. Cl.
*H04B 7/06* (2006.01)
*H04W 16/28* (2009.01)
*H04B 7/0456* (2017.01)

(52) U.S. Cl.
CPC ......... *H04B 7/0695* (2013.01); *H04B 7/0486* (2013.01); *H04B 7/0617* (2013.01); *H04W 16/28* (2013.01)

(58) Field of Classification Search
USPC .......................... 375/262; 370/252, 329, 203
See application file for complete search history.

(56) References Cited

U.S. PATENT DOCUMENTS

| | | | | |
|---|---|---|---|---|
| 2007/0191066 | A1* | 8/2007 | Khojastepour | H04B 7/0408 455/562.1 |
| 2008/0049596 | A1* | 2/2008 | Khojastepour | H04B 7/043 370/203 |
| 2013/0322280 | A1* | 12/2013 | Pi | H04W 72/0413 370/252 |
| 2016/0065290 | A1* | 3/2016 | Zhu | H04W 52/0209 370/329 |
| 2017/0264346 | A1* | 9/2017 | Yue | H04B 7/0417 |

(Continued)

*Primary Examiner* — Eva Y Puente
(74) *Attorney, Agent, or Firm* — Viering, Jentschura & Partner MBB (57) ABSTRACT

A mobile communication device is described comprising a receiver configured to receive, for each of a plurality of transmit beam directions, a reference signal transmitted based on the transmit beam direction, wherein each transmit beam direction has at least one allowable precoder, a determiner configured to determine, for each transmit beam direction, a reception quality of the reference signal transmitted based on the transmit beam direction, a preselector configured to preselect, from the plurality of transmit beam directions, a subset of transmit beam directions based on a comparison of the determined reception qualities, an evaluator configured to determine, for each transmit beam direction of the subset, an evaluation of the performance of the allowable precoders of the transmit beam direction, a selector configured to select, from the subset, a beam direction for communication, based on the evaluations and a controller configured to establish communications based on the selected beam direction.

20 Claims, 8 Drawing Sheets

(56) References Cited

U.S. PATENT DOCUMENTS

| | | | |
|---|---|---|---|
| 2017/0338875 A1* | 11/2017 | Berglund | H04B 7/0456 |
| 2018/0019795 A1* | 1/2018 | Zhang | H04B 7/0632 |
| 2018/0083676 A1* | 3/2018 | Wei | H04B 7/0452 |

* cited by examiner

MOBILE COMMUNICATION DEVICE AND METHOD FOR SELECTING A BEAM DIRECTION

CROSS-REFERENCE TO RELATED APPLICATION

This application claims priority to German Patent Application Serial No. 10 2017 110 348.1, which was filed May 12, 2017, and is incorporated herein by reference in its entirety.

TECHNICAL FIELD

Exemplary implementations described herein generally relate to mobile communication devices and methods for selecting a beam direction.

BACKGROUND

To increase the throughput in cellular communication systems, the usage of millimeter (mm) wave signals for radio transmission is considered. Since millimeter wave signals are typically more vulnerable to propagation loss than radio signals of longer wavelengths, the usage of directional antennas, i.e. beamforming, is considered, which, however requires a mechanism to select beam directions. Approaches allowing the efficient usage of beamforming are therefore desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance or illustration". Any embodiment or design described herein as "exemplary" is not necessarily to be construed as preferred or advantageous over other embodiments or designs.

Figure 1:
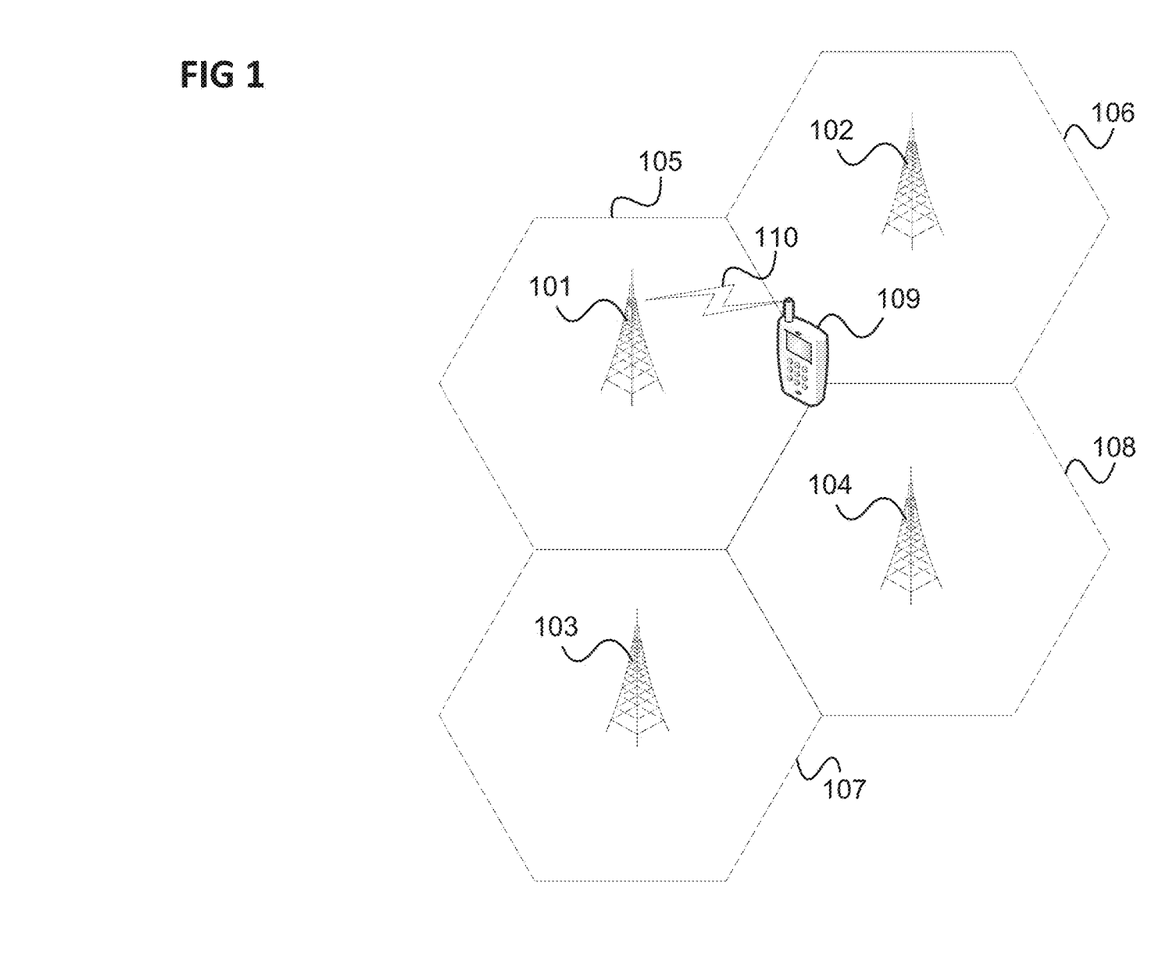
FIG. 1 shows an exemplary cellular communication system.

FIG. 1 shows a cellular communication system 100.

The cellular communication system includes a radio access network including a plurality of base stations 101-104, wherein each base station 101-104 operates a radio cell 105-108. A communication terminal (i.e. a subscriber terminal) 109 located in one of the radio cells, in this example a first radio cell 105 operated by a first base station 101, may communicate via a radio communication connection 110 with the first base station 101 to exchange data with the radio access network and for getting access to other networks connected to the radio access network, e.g. a core network of the cellular communication system 100 or the Internet.

The communication terminal may, for example, be a portable phone and may include typical communication terminal components such as a transceiver, an antenna, a subscriber identity module, an application processor, a memory, a display, a battery, a speaker, a microphone etc.

There are multiple generations of cellular communication systems: 2G such as GSM (Global System for Mobile Communications), 3G such as UMTS (Universal Mobile Telecommunications System) and 4G such as LTE (Long Term Evolution). For 5G (fifth generation wireless systems), there are concepts considering significant data throughput improvements by the use of millimeter wave spectrum and large bandwidth carriers. The millimeter wave radio resource may be shared between backhaul, front haul and access links. The millimeter wave technology is intended for spectrum with an absolute radio frequency so high that the spectrum range is well suited to offer very large bandwidths. However, the targeted frequency ranges have difficult propagation conditions, mainly caused by high atmospheric attenuation, e.g. absorption by water molecules and gases such as oxygen.

Specifically, the increasing demand for multi-gigabit throughput in Personal Area Networks (PANs), together with the advancements in mm-wave silicon circuit technologies make 60 GHz communication a desirable approach, given availability of 7 GHz of license free spectrum at these frequencies. Strong attenuation of mm-wave signals actually supports the opportunity of high density multi-user networks, but introduces a challenge for device connectivity across distances above 10 m. The latter may be overcome by using directional transmission, thus making the beamforming (BF) approach one of the typical key features of such a system.

Figure 2:
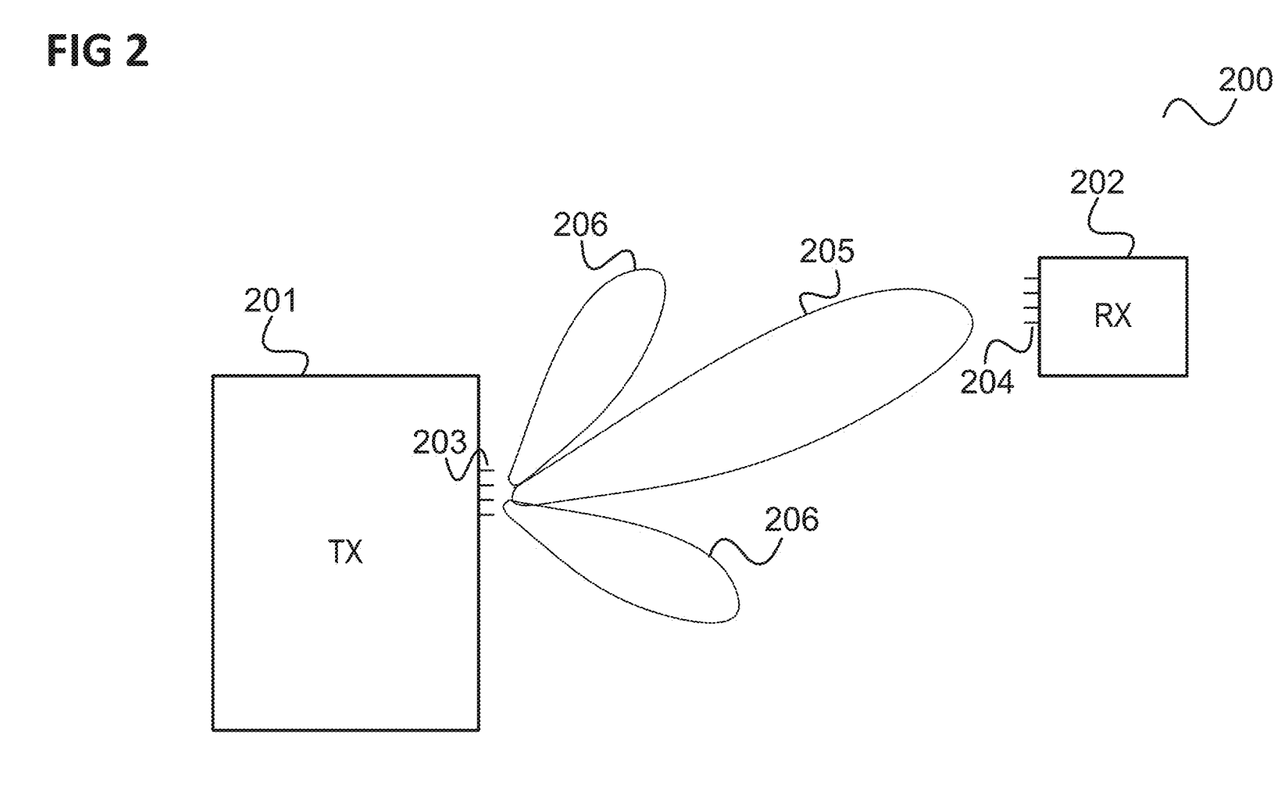
FIG. 2 shows a communication arrangement illustrating an exemplary beamformed transmit signal.

Beamforming is illustrated in FIG. 2.

FIG. 2 shows an exemplary communication arrangement 200.

The communication arrangement 200 includes a transmitter 201 (e.g. corresponding to one of the first base station 101 and the communication terminal 109) and a receiver (e.g. corresponding to the other of the first base station 101 and the communication terminal 109).

The transmitter 201 includes a directional transmit antenna 203 formed of a plurality of antennas (exciter elements) and the receiver 202 includes a directional receive antenna 204 formed of a plurality of antennas (exciter elements). By setting a phase shift between the antennas forming transmit antenna 203, the transmitter 201 may perform beamforming for a transmit signal such that the antenna gain primarily depends on the angle under which the transmitter is seen. In other words, the signal strength depends on the angle of departure from the transmitter 201. In this example, the gain is very high for the direction of a main lobe 205 (as represented by its size), medium for the direction of side lobes 206 and very small for all other directions. The main lobe 205 is also referred to as main beam direction. Similarly, the receiver 202 may, by setting a phase shift between the antennas forming the receive antenna 204, perform beamforming to cause the receive antenna gain dependent on the angle of arrival of a signal.

By beamforming, high antenna gains can be achieved for certain directions. These high antenna gains allow mitigation of and/or compensation for the additional path loss for millimeter waves, but may require that, in the example of a direct path (i.e. without reflections) as illustrated in FIG. 2, the transmitter (TX) angle of departure (AoD) of the main lobe 205 is perfectly matching the desired receiver (Rx) angle of arrival (AoA), i.e. the angle of arrival for which the receive antenna gain is high. In case of an indirect path, i.e. via a reflection at a certain object, the transmitter (TX) angle of departure (AoD) of the main lobe 205 is to match the direction of the object from the transmitter 201 and the desired receiver (Rx) angle of arrival (AoA) is to match the direction from the object to the receiver 202.

To maximize the possible distance between the transmitter 201 and the receiver 202, both structures have directional antennas 203, 204. For an exemplary application to a cellular communication system, both the base stations 101-104 as well as the subscriber terminals may have directional steerable millimeter wave antennas.

A high gain antenna, such as the transmit antenna 203 and the receive antenna 204, is typically composed of an array of exciter elements and by phase shifting devices and adjustment means for the phase shifts between the exciter elements. The beam (e.g. main lobe 205) can be steered over a certain (angular) range, without mechanical work (by phase shifting). Similarly, the reception pattern of the antenna 204 can be set. This is illustrated in FIG. 3.

Figure 3:
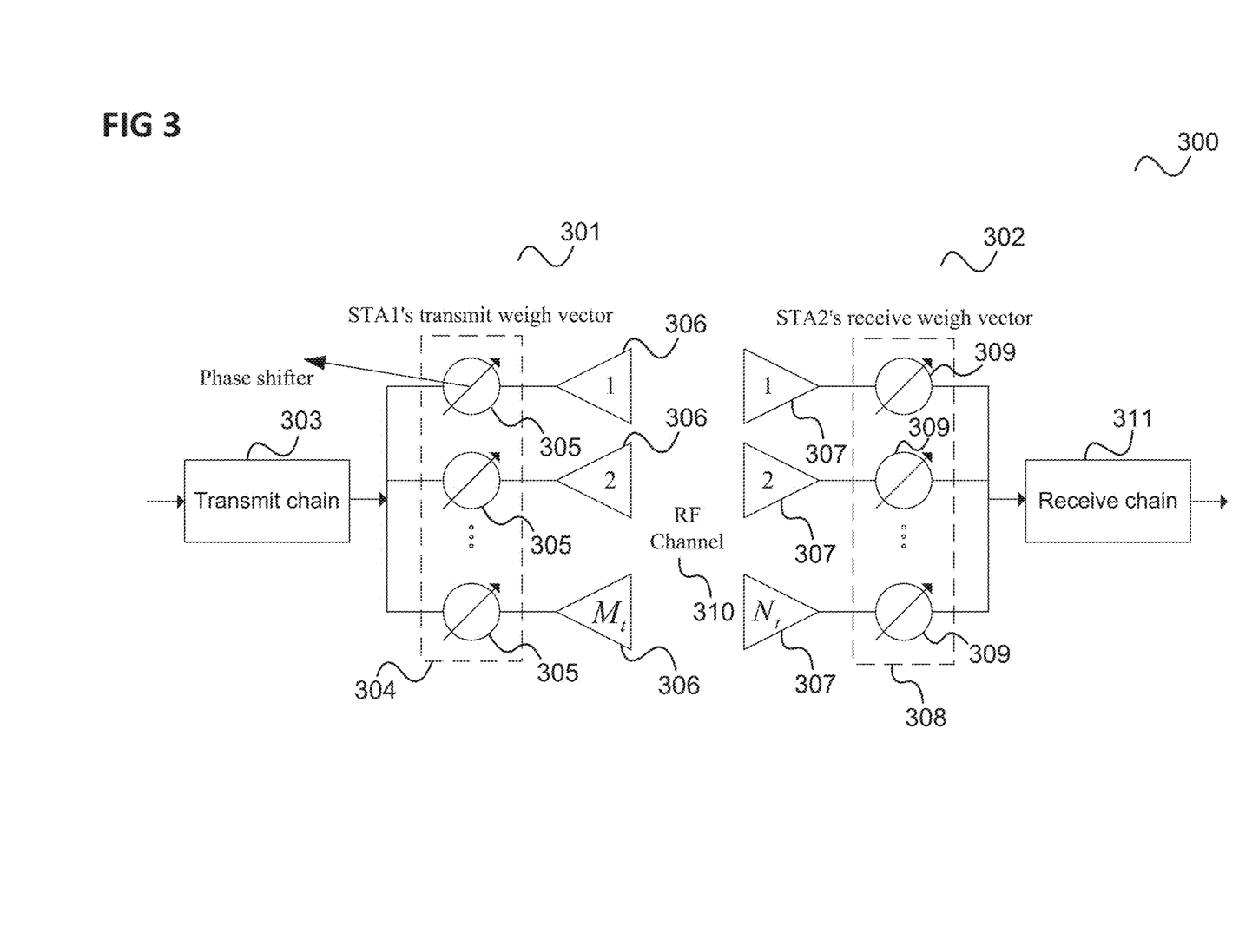
FIG. 3 shows a communication arrangement illustrating beamforming.

FIG. 3 shows an exemplary communication arrangement 300.

The communication arrangement 300 includes a transmitter 301, e.g. corresponding to transmitter 201, and a receiver 302, e.g. corresponding to receiver 202.

The transmitter 301 includes a transmit chain 303 via which data to be transmitted are supplied to a transmitter phase shifter array 304. The phase shifter array 304 includes a phase shifter 305 for each transmit antenna 306 of the transmitter 301. Each phase shifter 305 receives a signal corresponding to the data to be transmitted from the transmit chain 303, shifts its phase according to a respective component of a transmit antenna weight vector (AWV) and supplies the phase-shifted signal to the respective transmit antenna 306. Accordingly, by setting a certain transmit antenna weight vector, a certain radiation pattern, e.g. a certain direction of the main beam (referred to as the transmit beam) of the (overall) antenna formed by the transmit antennas 306 can be set.

Analogously, the receiver includes receive antennas 307 and a receiver phase shifter array 308 including a receiver phase shifter 309 for each receive antenna 307. Each receive antenna 307 receives the (overall) signal transmitted by the transmit antennas via the RF channel 310. The receive phase shifters 309 shift the received signals in accordance with a receive antenna weight vector and the results are combined and fed to a receive chain 311.

A wide range of communication systems employ link adaptation, whereby the transmit signal is modified based on channel state information (CSI) to enhance throughput performance. The CSI may, for example, depend on transmission parameters such as modulation and coding scheme (MCS), transmission rank (i.e. the rank of the effective channel matrix corresponding to the maximum number of MIMO (multiple input multiple output) layers that can be supported without throughput performance degradation, beam direction and precoding matrix. These transmission parameters may be set or modified to achieve a certain throughput or enhance throughput. CSI in some systems with reciprocal channels can be obtained at the transmitter, but in most systems the information needs to be estimated at the receiver then fed back to the transmitter. The CSI estimation typically uses a reception performance prediction metric, also known as channel quality metric, based on some reference signals (RSs) sent by the transmitter. In a beamforming system, such reference signals may be non-precoded (i.e. not beamformed) or precoded (i.e. beamformed), and the CSI feedback from the receiver may include indicators identifying preferred beam direction(s) corresponding to the highest channel quality metric value(s).

Beamformed reference signals allow a trade-off between reference signal overhead and receiver beam-search computation burden. With sufficient RS overhead budget, the transmitter can sweep a sequence of RSs periodically through a given beam space, i.e. the set of all possible beam directions. The receiver then can deduce a preferred beam direction by simply selecting the beam associated with a RS, i.e. a reference beam, according to a quality criterion. This approach is explored in some proposals for 5G and typically ensures that all RSs (beam directions) are associated with a common candidate range of transmission parameters (e.g. as the ones above). With less overhead budget, the number of supported RSs in a given time period may no longer be sufficient for beam space sweeps, and each RS may represent a sizable subspace of the beam space and thereby be associated with a sizable codebook, where the codebook may include the subspace represented by the reference beam (i.e. all possible beam directions of the subspace, e.g. identifications of the precoding matrices for all beam directions of the subspace). This approach favors more receiver computation over signal overhead and is explored in some proposals for 5G as well as in 3GPP (third generation partnership project) LTE FD-MIMO (full dimension multiple-input multiple-output) Class B configurations. In such systems, each beamformed RS may be associated with distinct conditions, i.e. distinct ranges of transmission parameters, to allow greater control over how to represent the network configuration and the beam space with a limited number of reference beams.

A major challenge in beam search at the receiver in a beamforming system with distinctly-conditioned beamformed RSs (i.e. each reference signal and thus beam direction being associated with its own set of possible transmission parameters) is reducing the computation burden arising from the need to consider the impact of rank range and codebook for each RS. In a system with a common rank range and a common codebook for all beamformed RSs, a receiver may greatly simplify its beam search by employing a channel quality metric that is independent of rank and precoding, called a non-precoded metric hereafter. One example of the non-precoded metric is received signal power of each RS, i.e. channel power. Such efficient non-precoded metrics do not, however, provide robust performance if each beamformed RS is associated with a distinct rank range and a distinct codebook (e.g. a respective set of possible precoders). As an example, choosing a reference beam with significantly higher received power than any other reference beams may still lead to lower throughput than choosing another reference beam, if the codebook of the chosen RS is much smaller and sparser than the codebooks of other RSs. This is because the data transmission associated with a not-chosen RS can potentially exploit the larger degree of freedom in transmission parameters, e.g. the precoder. Employing a precoded metric, i.e. a channel quality metric that depends on rank and precoding, involves however receiver computations that scale not only with respect to the number of reference beams but also with respect to the number of rank and precoder hypotheses (i.e. the number of possible ranks and the number of precoders associated with the various ranks from which the receiver may select).

Beam search computation effort at a receiver may be reduced by reducing the per-metric computation via efficient suboptimal metrics and reducing the number of precoder hypotheses via intelligently selecting the hypotheses to search over. When a precoded metric is required due to distinctly-conditioned beamformed RSs, however, these approaches may be insufficient for cost-competitive beam searches, especially in the context of powerful beamforming systems with huge codebooks, large rank ranges, and a sizable number of beamformed RSs, such as in LTE FD-MIMO Class B and certain massive MIMO proposals for 5G.

In the following, a class of beam search approaches for a receiver in a beamforming system with distinctly-conditioned beamformed reference signals is described that can substantially reduce the computation cost without catastrophic performance degradations.

For example, a beam search approach is provided which may be based on the following principles:

The reference beam directions may first be down-selected (i.e. reduced by a preselection) to a smaller number based on a simple non-precoded metric, where the number of down-selected reference beam directions (i.e. the number of reference beam directions after the preselection) may be based on an expected number of reference beams "hitting" the receiver. Then a beam search based on a precoded metric may be performed over the down-selected set of reference beam directions. This two-step approach can be seen to be motivated by the observation that only a small subset of reference beams typically "hits" a given receiver, especially in powerful beamforming systems with smaller beamwidth.

The down-selection may use any side information on the distinct rank and codebook conditions (such as the possible ranks or the number of possible precoders for each reference beam direction), in addition to the non-precoded metric. This approach may be seen to be motivated by the observation that beamforming communication systems with beamformed RSs, where each reference beam has distinct rank and codebook conditions, typically provide explicit side information on those conditions to each receiver.

Based on the above principles, a class of efficient two-step beam search approaches is provided which includes a preselection stage in which a small subset of the reference beam directions is selected based on a weighted non-precoded metric where the weight may depend on the rank and codebook conditions (including the rank range and the set of possible precoders).

A two-step beam search approach based on the above principles can substantially reduce the beam search computation at a receiver of a beamformed communication using distinctly-conditioned beamformed RSs. It allows addressing the challenge of distinctly-conditioned beamformed RS systems, where the straightforward CSI computation load scales with the number of reference beams as well as with the number of rank and precoder hypotheses. It should be noted that the distinctly-conditioned reference beamforming is a relatively recent concept, first introduced with LTE FD-MIMO Class B and being explored in 5G, to avoid the massive codebooks of the classical non-precoded reference signals as well as the sizable capacity overhead of the more straightforward uniformly-conditioned beamformed reference signals.

Figure 4:
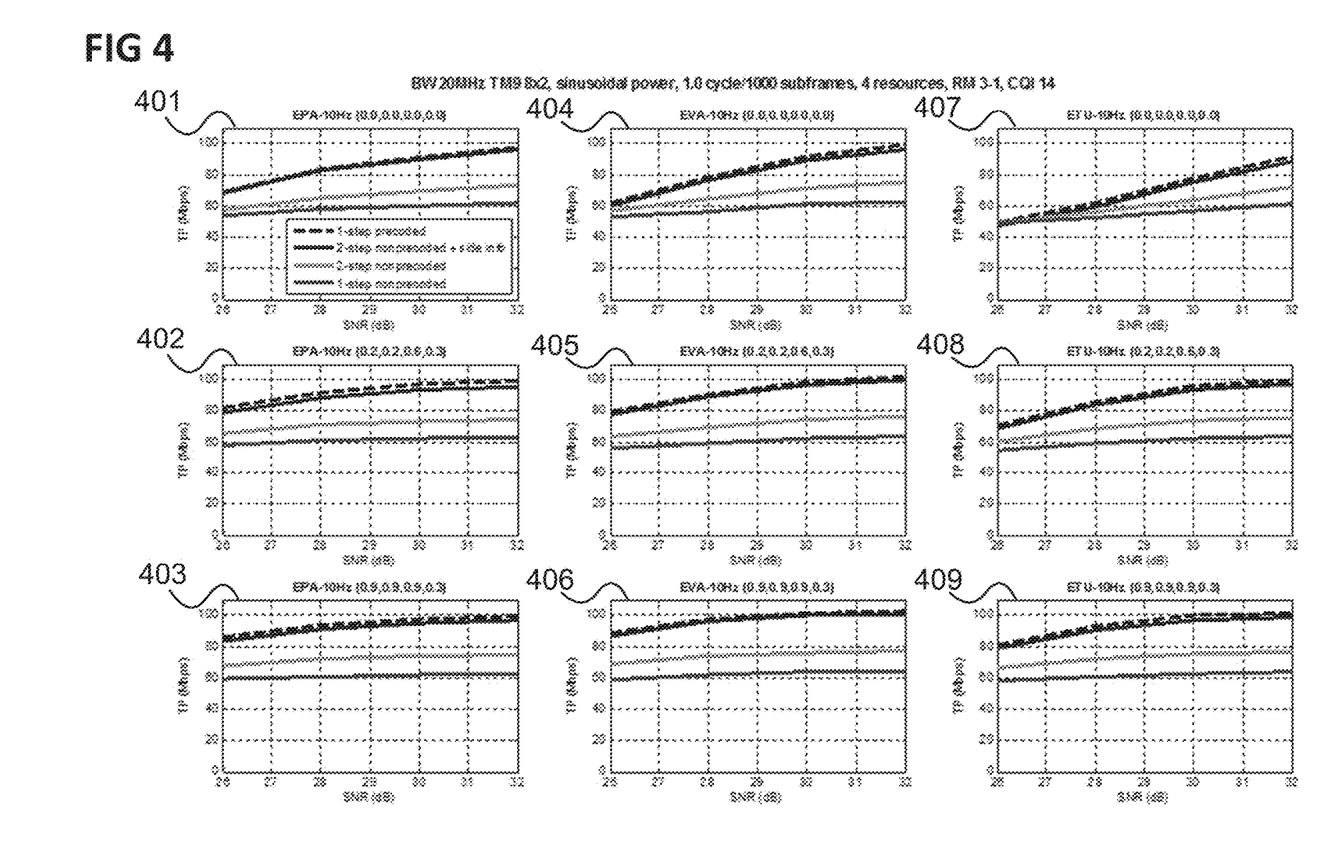
FIG. 4 shows examples of the throughput performance of an exemplary LTE (Long Term Evolution) MIMO (multiple-input multiple-output) system.

FIG. 4 shows examples of the throughput performance of an example LTE FD-MIMO Class B system with bandwidth 20 MHz, transmission mode 9, 8 CSI-RS (CSI-reference signal) antenna ports and 2 UE Rx antenna ports, 4 CSI-RS resources (reference beams), reporting mode 3-1, and CQI (channel quality indicator) fixed to 14. Of the four CSI-RS resources, three are restricted to rank 1 only while one has no restriction. FIG. 4 includes nine diagrams 401 to 409, each of which shows throughput curves (wherein throughput increases from bottom to top along the vertical axis) with respect to signal-to-noise ratio (which increases from left to right along the horizontal axis). The left diagrams 401, 402, 403 indicate throughputs for an EPA (extended pedestrian A) channel, the middle diagrams 404, 405, 406 indicate throughputs for an EVA (extended vehicular A) channel and the right diagrams 407, 408, 409 indicate throughputs for an ETU (extended typical urban) channel, all in the standard 3GPP RAN4 multi-beam test framework of distinct sinusoidal power variation for each beam. The upper row of diagrams 401, 404, 407 indicate throughputs for low correlation, the middle row of diagrams 402, 405, 408 indicate throughputs for a medium correlation and the bottom row of diagrams 403, 406, 409 indicate throughputs for a high correlation. Correlation here refers to the MIMO spatial correlation. It should be noted that as can be seen, the higher correlation also benefits the most from beamforming, in the sense that the higher beamforming gain can be achieved with higher correlation. This effect is especially pronounced in the particular example setup, because three out of four candidate beams are restricted to rank 1. That is, when such a rank-restricted beam is indeed optimal (the one unrestricted beam happens to be low strength), higher beamforming gain achievable with higher correlation can translate to higher throughput than what can be achieved with lower correlation (where it would have been better to switch to rank 2 but cannot due to the restriction).

In all cases, the dashed curve represents the optimum single-step precoded-metric search, the top solid curve represents a two-step down-selection to two resources based on non-precoded metric and side information in the form of codebook subset restriction (CBSR), the middle solid curve represents a two-step down-selection to two resources based on non-precoded metric only (i.e. without usage of side information in the preselection), and the bottom solid curve represents an exhaustive single-step search based on a non-precoded metric.

As can be seen from FIG. 4, the two-step beam search approach using both the non-precoded metric and side information can vastly outperform the two-step and one-step methods using non-precoded metrics without side information, while incurring only a minor extra computation over the two-step method with non-precoded metrics only. In general, as the number of reference beams increases and the non-uniformity of the per-beam rank range and codebook conditions increases, the performance of the single-step search based on non-precoded metric (bottom solid curve) as well as that of the two-step search based on non-precoded metric only (middle solid curve) rapidly degrade. The performance degradation of the two-step beam search approach using both the non-precoded metric and side information (top solid curve), however, is controllable and can be contained via appropriate weight construction schemes, as described below. This improvement is achieved with relatively little extra computation. In this example, the computation cost ratio corresponding to the dashed, top, middle and bottom curves is approximately 4:2:2:1 because the precoded metric, e.g. based on mutual information (MI), dominates the computation over the non-precoded metric, e.g. based on channel power, and the weighted non-precoded metric based on the CBSR. This computation cost saving can increase further with larger number of reference beams.

Thus, in the context of distinctly-conditioned reference beams, the two-step beam search approach using side information (according to the above two principles) can provide near-optimal performance while substantially reducing the computation cost and offer a flexible platform for trading off performance with implementation complexity by controlling the mapping of a side information to a weight as well as the number of down-selected reference beams at the preselection stage.

Figure 5:
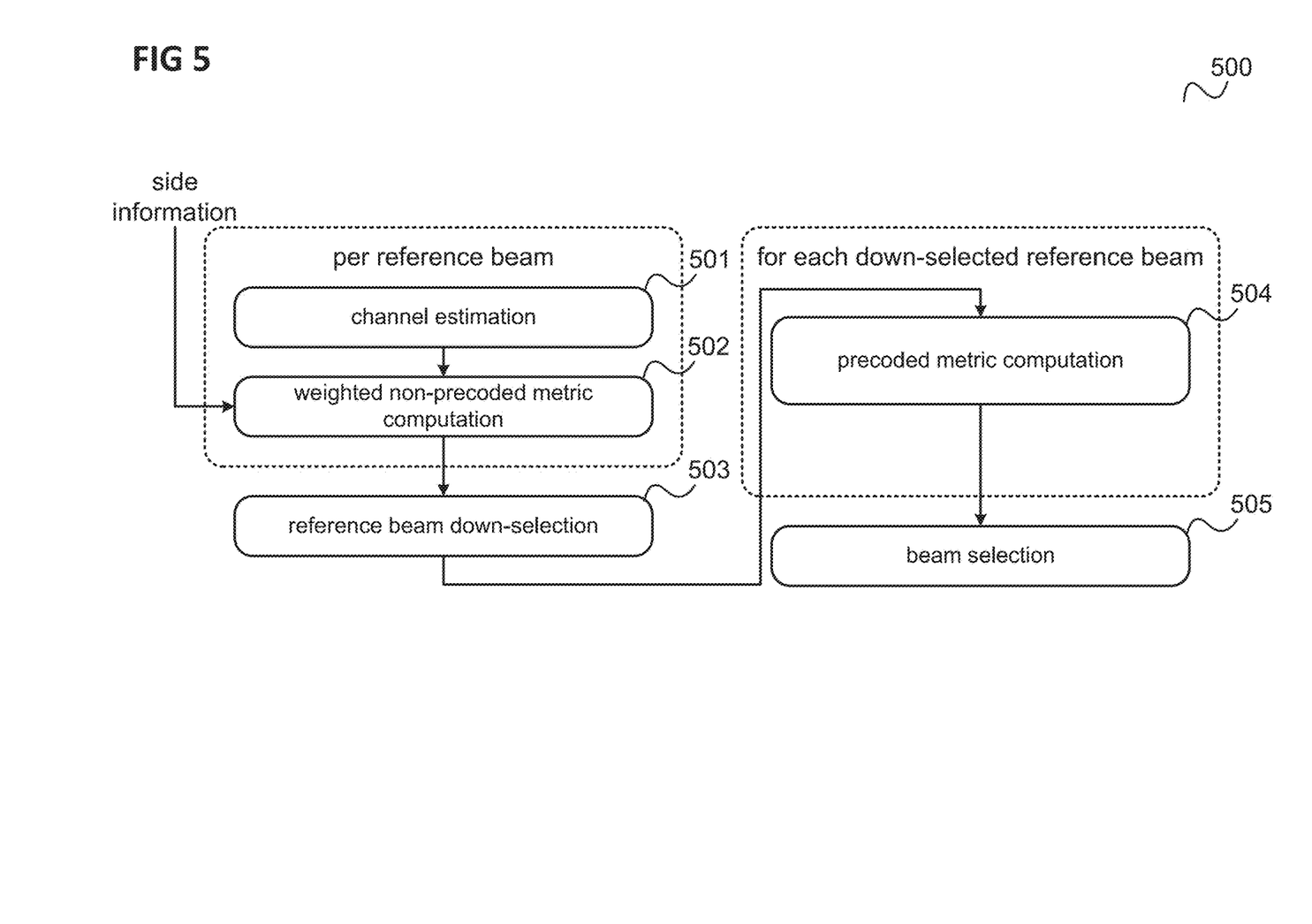
FIG. 5 shows a flow diagram illustrating an exemplary two-step beam search approach.

FIG. 5 shows a flow diagram 500 illustrating a two-step beam search approach.

The left column of blocks 501, 502, 503 corresponds to the preselection stage, and the right column of blocks 504, 505, 506 corresponds to the (final) selection stage.

In the preselection, in 501, the receiver (e.g. receiver 202) performs channel estimation for each reference beam (direction) and, in 502, computes a weighted non-precoded channel quality metric for the reference beam, based on the associated channel estimates and per-beam side information given from the transmitter (e.g. transmitter 201).

An example non-precoded metric is channel power, i.e. $\Sigma \mathrm{diag}(HH^H)$, where H denotes the channel estimate matrix, the superscript H denotes conjugate transpose operation, and the operation diag(A) of a matrix A returns the diagonal elements of the matrix. A weighted non-precoded metric for r-th reference beam may be in the form of $\tilde{m}[r]=w[r]\cdot m[r]$, where m[r] is the non-precoded metric and w[r] is the weight derived from a side information. More generalized weighting in the form of $\tilde{m}[r]=f(w[r], m[r])$ may be employed, where $f(\cdot)$ denotes an arbitrary function, although a simple multiplication is generally sufficient for achieving near-optimal beam search performance. The format and content of the side information may depend on the communication system and may contain the valid rank range and valid codebook for each reference beam. In this case, an example weight may depend on the number of valid (i.e. allowed or possible) precoders in the codebook and may depend on a monotonically increasing function of the valid ranks. In a second example, the weight may depend on the angular range that the set of valid precoders represents. In a third example, the weight may include a weighted sum of valid rank values, where the per-rank weight may reflect the relative throughput performance conditioned on the rank and the same channel power.

Based on such per-beam weighted non-precoded metrics, the receiver may, in 503, down-select (i.e. choose) a subset of the reference beams in a decreasing order of the weighted metric value, where the number of down-selected beams may be predetermined, e.g. based on an expected number of transmit beams whose strengths are larger than a certain threshold that represents minimum significance to UE reception performance. Alternatively, the receiver may dynamically determine the number of down-selected beams by selecting all beams whose strengths are within a certain fraction of the current maximum beam strength. Such a dynamic scheme may be complemented with a limit on the maximum number of down-selected beams, as a way of meeting a maximum computation cost target while reducing the average cost.

In the selection step, the receiver may perform a (e.g. classical) beam selection based on a precoded metric, with the set of candidate beams now being the set of down-selected beams from the preselection step.

Specifically, in 504, the receiver computes a precoded metric for each reference beam in the subset of reference beams generated in the preselection and performs a beam selection based on the result in 505.

It should be noted that in the degenerate case of uniformly-conditioned reference beams, the receiver may ignore the side information via assigning the same weight for all beams, and the beam search may be effectively transformed to a one-step method by down-selecting to only one reference beam in the first step without going to the second step.

Figure 6:
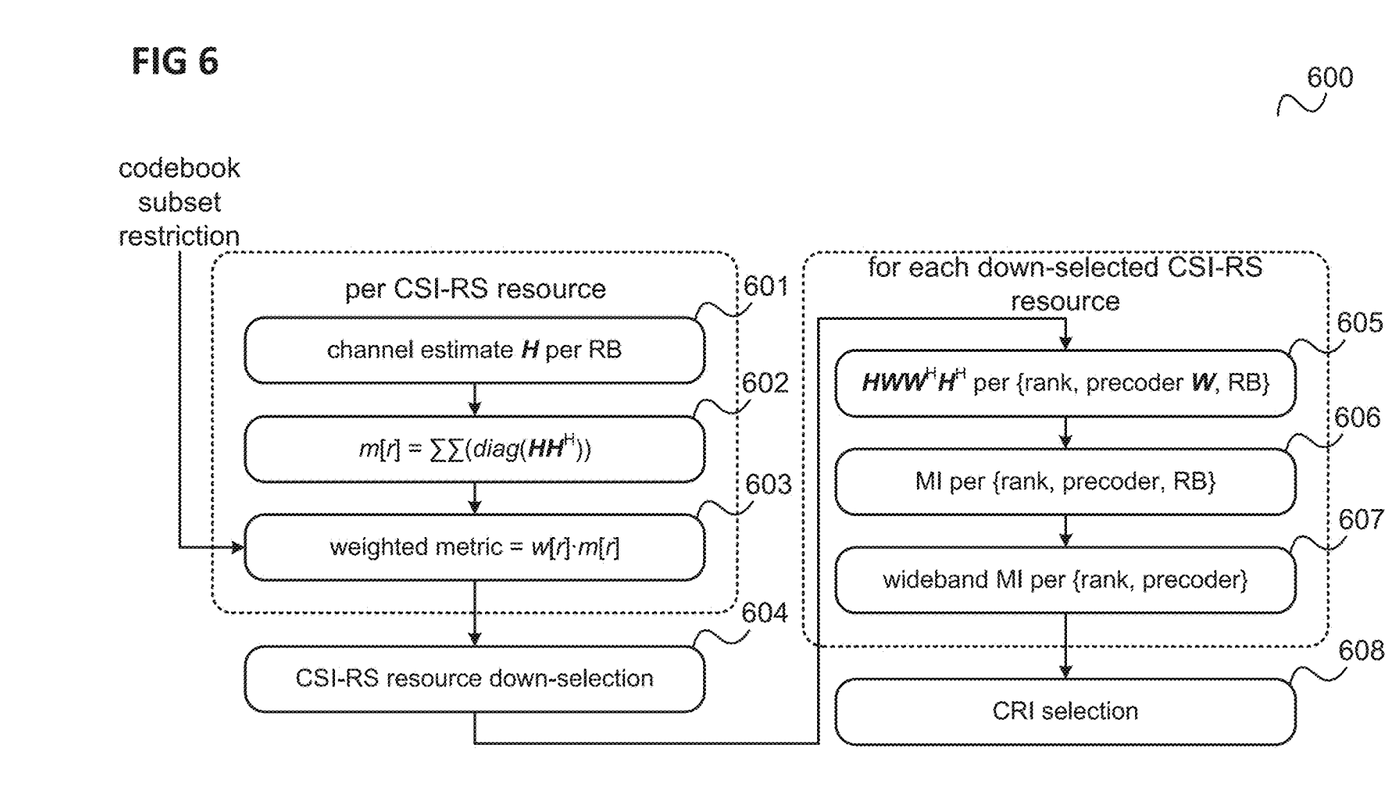
FIG. 6 shows a flow diagram illustrating an exemplary two-step beam search approach for the example of an LTE MIMO configuration.

FIG. 6 shows a flow diagram 600 illustrating a two-step beam search approach for the example of an LTE FD-MIMO Class B configuration.

In this Class B context, a reference beam is represented by a CSI-RS resource, each CSI-RS resource is associated with its own codebook subset restriction (CBSR) and a beam index to be reported from the receiver to the transmitter for indicating a selected beam direction is in the form of a CSI-RS resource indicator (CRI). Thus a Class B beam search can be seen to amount to a CRI selection.

As in FIG. 5, the left column of blocks 601, 602, 603 corresponds to the preselection stage, and the right column of blocks 604, 605, 606 corresponds to the (final) selection stage.

In the preselection the receiver performs channel estimation in 601, non-precoded metric computation in 602, weight generation based on the set of per-beam CBSRs and weighted metric computation in 603 for each CSI-RS resource and CSI-RS resource down-selection based on the computed values of the weighted metric in 604.

The channel estimation produces the channel estimate matrices H[b; r], where b is a RB (resource block) index and r is the CSI-RS resource index. The non-precoded channel quality metric computation may include the computation $$m[r] = \sum_b \sum \mathrm{diag}(H[b; r]H^H[b; r]),$$

where the outer summation is taken over the diagonal elements of the matrix resulting from the inner summation. The weight generation in this example may produce the weight $$w[r] = \max_{v_r}\left(f(v_r) \cdot \sum (i_{CBSR,v_r,r})\right),$$

where f(·) is a monotonically increasing function, $v_r \in \{1, 2, 3, \ldots\}$ spans the set of valid rank hypotheses, $i_{CBSR,v_r r}$ is the conditional CBSR bitmap for rank $v_r$ and beam r, and the bitmap summation is taken over the bits, wherein the bitmap has a bit for each precoder for the rank $v_r$ and a value of one of the bit indicates that the associated precoder is valid. In other words, the summed value amounts to the number of valid precoders. An example f(·) that achieves robust performance in a range of Class B scenarios is $f(v)=v^2$. The weighted metric computation may compute $\tilde{m}[r]=w[r]\cdot m[r]$. At the end of the preselection stage, the CSI-RS resource down-selection may produce a set of down-selected beams $\{\tilde{r}\}$ by selecting a number of beam directions in decreasing order of $\tilde{m}[r]$. Down-selecting to two beam directions can provide reasonable performance-cost trade-off in 3GPP Release-13 Class B systems with up to eight reference beams.

The (final) selection stage of the beam search approach may be based on any CSI measurement methodology. An example selection stage in a mutual information (MI) framework may include effective channel covariance computation in 605, sample MI estimation in 606, wideband MI averaging in 607, and CRI selection in 608.

The effective channel covariance computation may compute $H[b; r] W_{p_{\tilde{r}}}^{(v_{\tilde{r}})} W_{p_{\tilde{r}}}^{(v_{\tilde{r}})H} H^H[b; r]$ for each $\tilde{r}$, where $W_{p_{\tilde{r}}}^{(v_{\tilde{r}})}$ denotes the precoding matrix, or the precoder for short, associated with the rank $v_{\tilde{r}}$ and precoder index $p_{\tilde{r}}$ conditioned on $\tilde{r}$. The sample MI estimation computes a sample MI estimate per $\{v_{\tilde{r}}, p_{\tilde{r}}, b\}$ for each $\tilde{r}$, e.g. via a classical method based on the effective channel covariance. The wideband MI averaging generates one MI value $I_{p_{\tilde{r}}}^{(v_{\tilde{r}})}[\tilde{r}]$ per rank and precoder for each $\tilde{r}$, by averaging the sample MI estimates over all relevant RBs. Finally, the CRI selection chooses one down-selected $\tilde{r}$ via $$\hat{r} = \underset{\tilde{r}}{\operatorname{argmax}}\left(\underset{v_{\tilde{r}},p_{\tilde{r}}}{\max}\left(I_{p_{\tilde{r}}}^{(v_{\tilde{r}})}[\tilde{r}]\right)\right).$$

Figure 7:
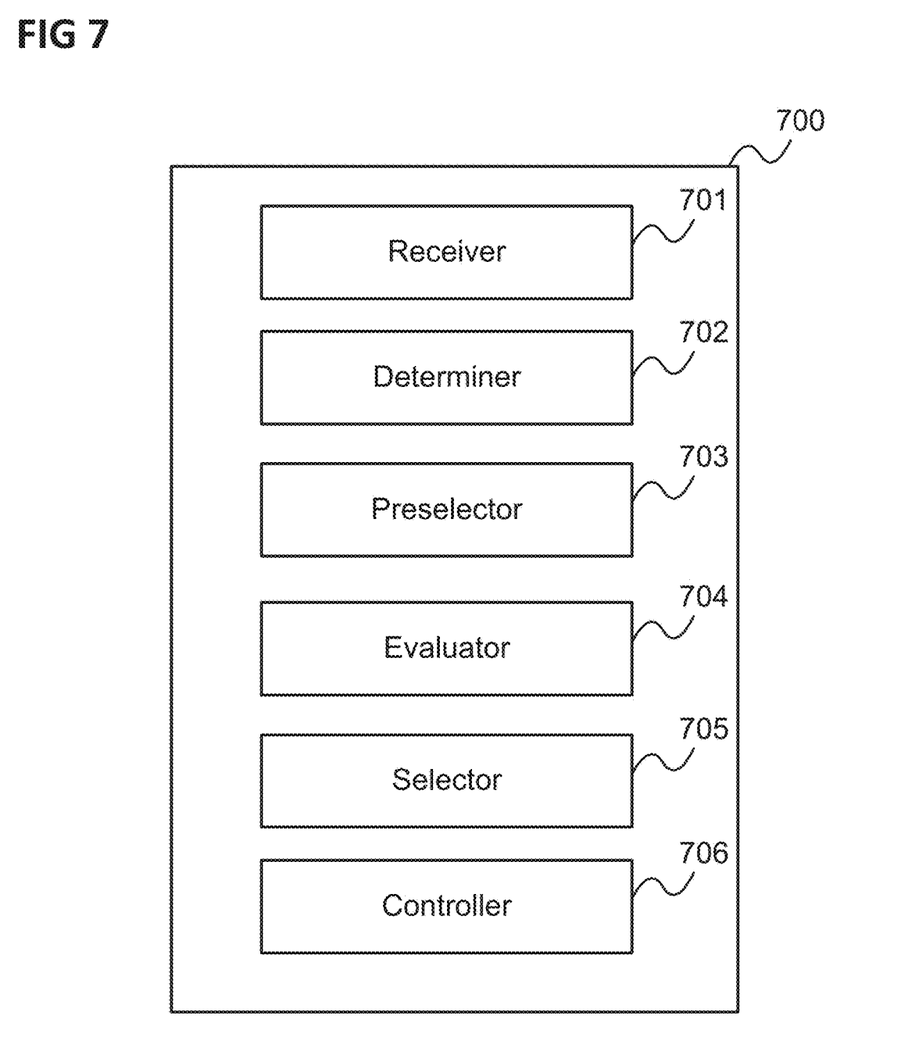
FIG. 7 shows an exemplary mobile communication device.

In summary, according to various embodiments, a mobile communication device is provided as illustrated in FIG. 7.

FIG. 7 shows an exemplary mobile communication device 700.

The mobile communication device 700 includes a receiver 701 configured to receive, for each of a plurality of transmit beam directions, a reference signal transmitted based on the transmit beam direction, wherein each transmit beam direction has at least one allowable precoder.

Furthermore, the mobile communication device 700 includes a determiner 702 configured to determine, for each of the plurality of transmit beam directions, a reception quality of the reference signal transmitted based on the transmit beam direction.

The mobile communication device 700 further includes a preselector 703 configured to preselect, from the plurality of transmit beam directions, a subset of transmit beam directions based on a comparison of the determined reception qualities.

The mobile communication device 700 further includes a evaluator 704 configured to determine, for each transmit beam direction of the subset of transmit beam directions, an evaluation of the performance of the allowable precoders of the transmit beam direction.

Further, the mobile communication device 700 includes a selector 705 configured to select, from the subset of transmit beam directions, a beam direction for communication based on the at least one determined evaluation.

The mobile communication device 700 further includes a controller 706 configured to establish communications based on the beam direction selected for communication.

According to various examples, the number of beam directions among which to search (i.e. among which to select a beam direction for communication) is reduced via a preselection based on a less accurate evaluation and the selection of a beam for communication is performed among the reduced number of beam directions based on a more accurate metric.

According to various examples, a two-step beam search approach for a receiver in a beamforming system with distinctly-conditioned beamformed reference signals is provided, whereby an initial set of candidate beams is down-selected to a subset based on a non-precoded channel quality metric as well as some side information on distinct per-beam rank range and/or codebooks.

The exemplary beam search methodology of FIG. 7 may be viewed as adding a light-weight screening step to reduce the number of candidate hypotheses that a receiver (e.g. a main search engine implemented in a receiver) considers in the beam search.

The components of the mobile communication device (e.g. the receiver, the determiner, the preselector, the evaluator, the selector and the controller) may, for example, be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit". The components of the mobile communication device may, for example, be part of a transceiver of the communication device and may, for example, be at least partially implemented by a modem (e.g. an LTE modem), a baseband processor or other transceiver components or also by an application processor of the communication device. The mobile communication device may, for example, be a communication terminal such as a portable phone and may include typical communication terminal components such as a transceiver (comprising e.g. a baseband processor, one or more filters, transmit chains, receive chains, amplifiers etc.), an antenna, a subscriber identity module, an application processor, a memory, a display, a battery, a speaker, a microphone etc.

It should be noted that the exemplary approach of FIG. 7 as well as the other examples and illustrations are not limited to mm wave, but also can be applicable in lower bands as well. While higher bands have greater necessity for beam-forming, lower bands in LTE, 5G, and other systems also support it and benefit from it, via stronger received signal and reduced interference. Furthermore, it should be noted that the exemplary approach of FIG. 7 as well as the other examples and illustrations may be applied to both one-sided and two-sided beamforming, and combination thereof (i.e., beamforming on both the transmitter side and the receiver side, and combination thereof).

Figure 8:
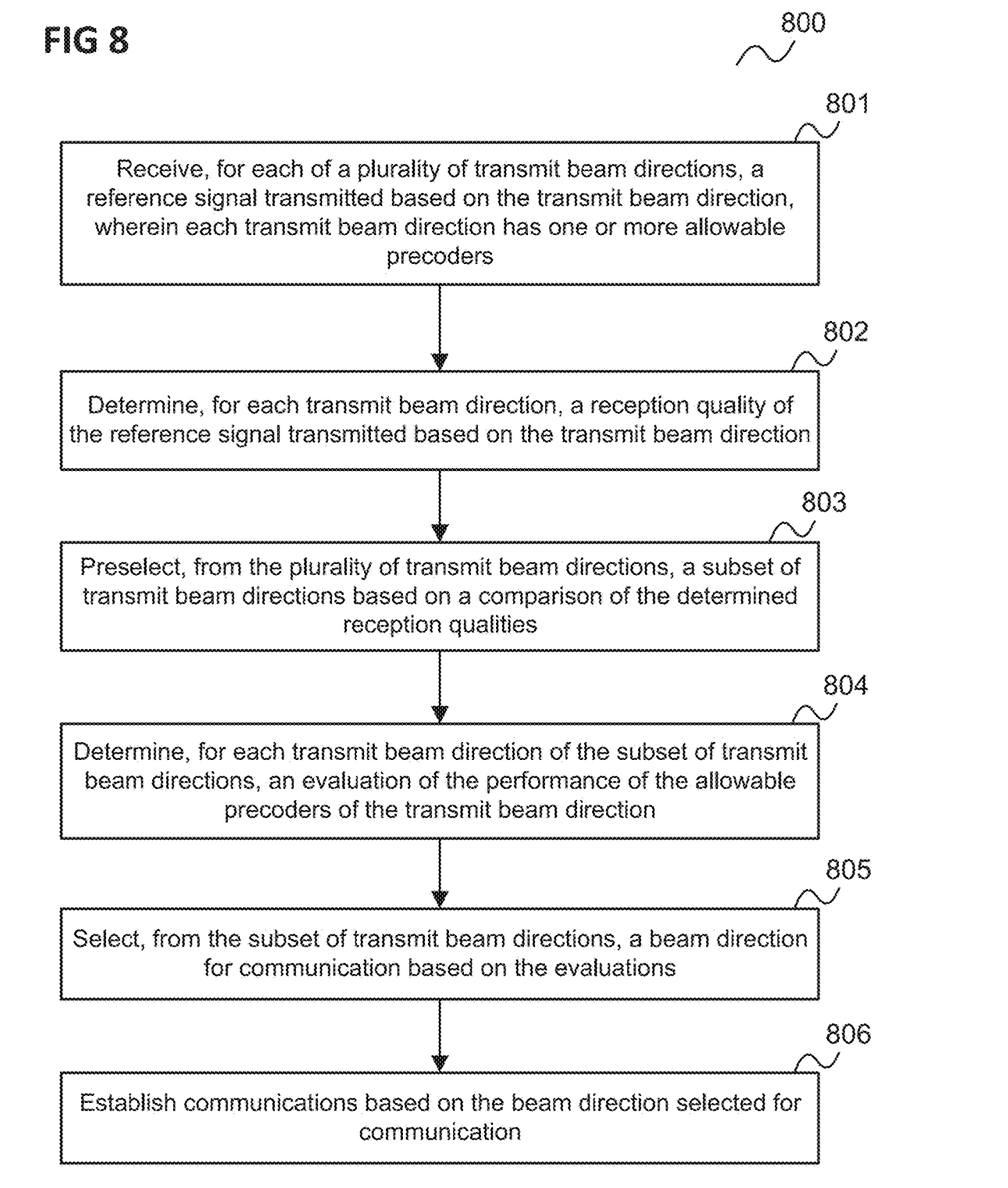
FIG. 8 shows a flow diagram illustrating an exemplary method for selecting a beam direction, for example carried out by a communication device.

The mobile communication device may, for example, carry out a method as illustrated in FIG. 8.

FIG. 8 shows a flow diagram 800 illustrating an exemplary method for selecting a beam direction, for example, performed by a communication device, e.g. by a controller in a radio communication subsystem such as an LTE subsystem, e.g. in a modem.

In 801, the communication device receives, for each of a plurality of transmit beam directions, a reference signal transmitted based on the transmit beam direction, wherein each transmit beam direction has at least one allowable precoder.

In 802, the communication device determines, for each transmit beam direction, a reception quality of the reference signal transmitted based on the transmit beam direction.

In 803, the communication device preselects, from the plurality of transmit beam directions, a subset of transmit beam directions based on a comparison of the determined reception qualities.

In 804, the communication device determines, for each transmit beam direction of the subset of transmit beam directions, an evaluation of the performance of the allowable precoders of the transmit beam direction.

In 805, the communication device selects, from the subset of transmit beam directions, a beam direction for communication based on the evaluations.

In 806, the communication device establishes communications based on the beam direction selected for communication.

The following examples pertain to further exemplary implementations.

Example 1 is a mobile communication device as illustrated in FIG. 7.

In Example 2, the subject-matter of Example 1 may optionally include each transmit beam direction corresponding to a direction subspace and each precoder of the transmit beam direction corresponding to a direction in the direction subspace.

In Example 3, the subject-matter of any one of Examples 1-2 may optionally include each transmit beam direction having an associated set of allowable ranks including one or more allowable ranks, where a rank is a number of spatially multiplexed signal layers.

In Example 4, the subject-matter of Example 3 may optionally include each transmit beam direction having an associated set of allowable precoders for each allowable rank including one or more allowable precoders for the allowable rank.

In Example 5, the subject-matter of Example 4 may optionally include the preselector being configured to preselect the subset of transmit beam directions based on, for each transmit beam direction, a measure of the associated set of allowable ranks or the associated set of allowable precoders or both.

In Example 6, the subject-matter of Example 5 may optionally include the measure of the associated set of allowable precoders being based on the number of allowable precoders in the set.

In Example 7, the subject-matter of Example 6 may optionally include the measure of the set of allowable precoders being based on a weighting of each precoder based on a rank associated with the precoder.

In Example 8, the subject-matter of any one of Examples 1-7 may optionally include determining the reception quality of the reference signal for a transmit beam direction including determining a channel matrix for the transmit beam direction and determining the reception quality based on the channel matrix.

In Example 9, the subject-matter of Example 8 may optionally include determining the reception quality of the reference signal for a transmit beam direction including determining a metric of the channel matrix for the transmit beam direction.

In Example 10, the subject-matter of any one of Examples 1-9 may optionally include the determiner being configured to determine the reception quality of the reference signal for each transmit beam direction independently from effective channel matrices of the precoders of the transmit beam directions.

In Example 11, the subject-matter of any one of Examples 1-10 may optionally include the evaluator being configured to determine the evaluation based on an effective channel matrix of each precoder of the allowable precoders.

In Example 12, the subject-matter of any one of Examples 1-11 may optionally include establishing communications based on the beam direction selected for communication including signaling to a communication device an indication of the beam direction selected for communication.

In Example 13, the subject-matter of any one of Examples 1-12 may optionally be a communication terminal.

In Example 14, the subject-matter of any one of Examples 1-13 may optionally be a subscriber terminal of a cellular mobile communication system.

Example 15 is a method for selecting a beam direction as illustrated in FIG. 8.

In Example 16, the subject-matter of Example 15 may optionally include each transmit beam direction corresponding to a direction subspace and each precoder of the transmit beam direction corresponding to a direction in the direction subspace.

In Example 17, the subject-matter of any one of Examples 15-16 may optionally include each transmit beam direction having an associated set of allowable ranks including one or more allowable ranks, where a rank is a number of spatially multiplexed signal layers.

In Example 18, the subject-matter of Example 17 may optionally include each transmit beam direction having an associated set of allowable precoders for each allowable rank including one or more allowable precoders for the allowable rank.

In Example 19, the subject-matter of Example 18 may optionally include preselecting the subset of transmit beam directions based on, for each transmit beam direction, a measure of the associated set of allowable ranks or the associated set of allowable precoders or both.

In Example 20, the subject-matter of Example 19 may optionally include the measure of the associated set of allowable precoders being based on the number of allowable precoders in the set.

In Example 21, the subject-matter of Example 20 may optionally include the measure of the set of allowable precoders being based on a weighting of each precoder based on a rank associated with the precoder.

In Example 22, the subject-matter of any one of Examples 15-21 may optionally include determining the reception quality of the reference signal for a transmit beam direction including determining a channel matrix for the transmit beam direction and determining the reception quality based on the channel matrix.

In Example 23, the subject-matter of Example 22 may optionally include determining the reception quality of the reference signal for a transmit beam direction including determining a metric of the channel matrix for the transmit beam direction.

In Example 24, the subject-matter of any one of Examples 15-23 may optionally include determining the reception quality of the reference signal for each transmit beam direction independently from effective channel matrices of the precoders of the transmit beam directions.

In Example 25, the subject-matter of any one of Examples 15-24 may optionally include determining the evaluation based on an effective channel matrix of each precoder of the allowable precoders.

In Example 26, the subject-matter of any one of Examples 15-25 may optionally include establishing communications based on the beam direction selected for communication including signaling to a communication device an indication of the beam direction selected for communication.

In Example 27, the subject-matter of any one of Examples 15-26 may optionally be performed by a communication terminal.

In Example 28, the subject-matter of any one of Examples 15-27 may optionally be performed by a subscriber terminal of a cellular mobile communication system.

According to a further example, a communication terminal is provided which performs a selection of a subset of beam directions based on a first quality metric of the beam directions and a selection of a beam direction from the subset based on a second quality metric of the beam directions wherein the second quality metric is more accurate than the first quality metric, i.e. its computation is more complex, it gives a more accurate evaluation of the respective communication performance of the beam direction etc.

According to various implementations, an apparatus and a method for determining a beam direction from a transmitter at a receiver in a beamforming radio communications network with beamformed reference signals is provided, including:

estimating the channel of each reference beam, i.e. the beam of a reference signal; generating a weight for each reference beam based on a side information about a distinct rank and codebook condition of the beam;

computing a weighted channel quality metric for each reference beam based on the said weight and a channel quality metric that depends on the channel estimate but not necessarily on the rank and codebook conditions;

selecting a subset of the reference beams, based on the weighted channel quality metric; and selecting the reference beam to be reported to the transmitter, among the selected subset, based on a channel quality metric that depends on the rank and codebook conditions.

For example, the side information indicates valid rank hypotheses and/or valid precoding matrix hypotheses for each reference beam.

The side information may, for example, be given by the transmitter or predefined in the system.

For example, the channel quality metric that does not depend on rank and codebook conditions reflects non-precoded channel power.

The weight used in the weighted channel quality metric may, for example, depend on the number of valid precoding matrix hypotheses, and/or the angular range corresponding to the set of valid precoding matrix hypotheses, and/or a monotonically increasing function of a valid rank hypothesis, and/or a weighted sum of valid rank hypotheses.

The number of reference beams including the selected subset is, for example, predetermined based on an expected number of reference beams whose received energy values are larger than a certain threshold.

The number of reference beams including the selected subset may, for example, be adaptively chosen by selecting all reference beams the received energy values of which are within a certain fraction of the maximum reference-beam received energy.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A mobile communication device comprising:
a receiver configured to receive, for each of a plurality of transmit beam directions, a reference signal transmitted based on the transmit beam direction, wherein each transmit beam direction has at least one allowable precoder;
a determiner configured to determine, for each transmit beam direction, a reception quality of the reference signal transmitted based on the transmit beam direction;
a preselector configured to preselect, from the plurality of transmit beam directions, a subset of transmit beam directions based on a comparison of the determined reception qualities;
an evaluator configured to determine, for each transmit beam direction of the subset of transmit beam directions, an evaluation of the performance of the allowable precoders of the transmit beam direction;
a selector configured to select, from the subset of transmit beam directions, a beam direction for communication based on the evaluations; and
a controller configured to establish communications based on the beam direction selected for communication.

2. The mobile communication device of claim 1, wherein each transmit beam direction corresponds to a direction subspace and each precoder of the transmit beam direction corresponds to a direction in the direction subspace.

3. The mobile communication device of claim 1, wherein each transmit beam direction has an associated set of allowable ranks comprising one or more allowable ranks, where a rank is a number of spatially multiplexed signal layers.

4. The mobile communication device of claim 3, wherein each transmit beam direction has an associated set of allowable precoders for each allowable rank, comprising one or more allowable precoders for the allowable rank.

5. The mobile communication device of claim 4, wherein the preselector is configured to preselect the subset of transmit beam directions based on, for each transmit beam direction, a measure of the associated set of allowable ranks or the associated set of allowable precoders or both.

6. The mobile communication device of claim 5, wherein the measure of the associated set of allowable precoders is based on the number of allowable precoders in the set.

7. The mobile communication device of claim 6, wherein the measure of the set of allowable precoders is based on a weighting of each precoder based on a rank associated with the precoder.

8. The mobile communication device of claim 1, wherein determining the reception quality of the reference signal for a transmit beam direction comprises determining a channel matrix for the transmit beam direction and determining the reception quality based on the channel matrix.

9. The mobile communication device of claim 8, wherein determining the reception quality of the reference signal for a transmit beam direction comprises determining a metric of the channel matrix for the transmit beam direction.

10. The mobile communication device of claim 1, wherein the determiner is configured to determine the reception quality of the reference signal for each transmit beam direction independently from effective channel matrices of the precoders of the transmit beam directions.

11. The mobile communication device of claim 1, wherein the evaluator is configured to determine the evaluation based on an effective channel matrix of each precoder of the allowable precoders.

12. The mobile communication device of claim 1, wherein establishing communications based on the beam direction selected for communication comprises signaling to a communication device an indication of the beam direction selected for communication.

13. The mobile communication device of claim 1, being a communication terminal.

14. The mobile communication device of claim 1, being a subscriber terminal of a cellular mobile communication system.

15. A method for selecting a beam direction comprising:
receiving, for each of a plurality of transmit beam directions, a reference signal transmitted based on the transmit beam direction, wherein each transmit beam direction has at least one allowable precoder;
determining, for each transmit beam direction, a reception quality of the reference signal transmitted based on the transmit beam direction;
preselecting, from the plurality of transmit beam directions, a subset of transmit beam directions based on a comparison of the determined reception qualities;
determining, for each transmit beam direction of the subset of transmit beam directions, an evaluation of the performance of the allowable precoders of the transmit beam direction;
selecting, from the subset of transmit beam directions, a beam direction for communication based on the evaluations; and
establishing communications based on the beam direction selected for communication.

16. The method of claim 15, wherein each transmit beam direction corresponds to a direction subspace and each precoder of the transmit beam direction corresponds to a direction in the direction subspace.

17. The method of claim 15, wherein each transmit beam direction has an associated set of allowable ranks comprising one or more allowable ranks, where a rank is a number of spatially multiplexed signal layers.

18. The method of claim 17, wherein each transmit beam direction has an associated set of allowable precoders for each allowable rank, comprising one or more allowable precoders for the allowable rank.

19. The method of claim 18, comprising preselecting the subset of transmit beam directions based on, for each transmit beam direction, a measure of the associated set of allowable ranks or the associated set of allowable precoders or both.

20. The method of claim 19, wherein the measure of the associated set of allowable precoders is based on the number of allowable precoders in the set.

* * * * *